United States Patent
Chen et al.

(10) Patent No.: US 10,725,001 B2
(45) Date of Patent: Jul. 28, 2020

(54) LIQUID CRYSTAL COMPOSITION, PH SENSING DEVICE USING THE SAME, AND PH SENSING DEVICE KIT USING THE SAME

(71) Applicant: Tamkang University, New Taipei (TW)

(72) Inventors: Chih-Hsin Chen, New Taipei (TW); Wei-Long Chen, New Taipei (TW); Tsung-Yang Ho, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 367 days.

(21) Appl. No.: 15/644,051

(22) Filed: Jul. 7, 2017

(65) Prior Publication Data
US 2018/0156764 A1    Jun. 7, 2018

(30) Foreign Application Priority Data
Dec. 7, 2016    (TW) .............................. 105140512 A

(51) Int. Cl.
*G01N 31/22*    (2006.01)
*C09K 19/56*    (2006.01)
(Continued)

(52) U.S. Cl.
CPC ........... *G01N 31/221* (2013.01); *C09K 19/54* (2013.01); *C09K 19/56* (2013.01); *G01N 21/77* (2013.01);
(Continued)

(58) Field of Classification Search
CPC ................. G01N 31/221; G01N 21/77; G01N 2021/7763; G01N 2021/7769;
(Continued)

(56) References Cited

U.S. PATENT DOCUMENTS 3,972,589 A    8/1976  Skelly et al.
4,017,416 A *  4/1977  Inukai ................... C07C 255/00
                                                                252/299.65
(Continued)

OTHER PUBLICATIONS

Magnusson et al. "Real-time optical pH measurement in a standard microfluidic cell culture system" Biomedical Optics Express Sep. 1, 2013 vol. 4, No. 9 (Year: 2013).*
(Continued)

*Primary Examiner* — Samuel P Siefke
*Assistant Examiner* — Quocan B Vo
(74) *Attorney, Agent, or Firm* — Andrew M. Calderon; Roberts Calderon Safran & Cole, P.C.

(57) ABSTRACT

A liquid crystal composition includes a nematic liquid crystal, and a compound of Formula (I) where R is an alkyl, aryl, aralkyl or heteroaryl having 6 to 30 carbon atoms, wherein the compound accounts for 0.3 to 0.6% of the liquid crystal composition.

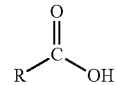

Formula (I)

Further, a sensing device includes a substrate, a frame, an alignment film, the liquid crystal composition as described above, and two polarizers. The frame is connected to the substrate and forms an accommodation space having an opening, and the alignment film and the liquid crystal composition are both located inside the accommodation space. One of the polarizers is arranged in correspondence with the opening such that a channel exists between the polarizer and the frame, the other polarizer is located at a lateral side of the substrate, and the polarization directions of the two polarizers intersect with each other.

19 Claims, 17 Drawing Sheets
(10 of 17 Drawing Sheet(s) Filed in Color)

(51) Int. Cl.
*G01N 21/77* (2006.01)
*C09K 19/54* (2006.01)
*G01N 21/21* (2006.01)
*C09K 19/12* (2006.01)

(52) U.S. Cl.
CPC .. *C09K 2019/122* (2013.01); *C09K 2019/123* (2013.01); *C09K 2219/15* (2013.01); *C09K 2219/17* (2013.01); *G01N 21/21* (2013.01); *G01N 2021/7763* (2013.01); *G01N 2021/7769* (2013.01)

(58) Field of Classification Search
CPC ........ G01N 21/21; C09K 19/54; C09K 19/56; C09K 2019/123; C09K 2019/122; C09K 2219/17; C09K 2219/15
See application file for complete search history.

(56) References Cited

U.S. PATENT DOCUMENTS

| | | | | |
|---|---|---|---|---|
| 4,711,530 A | * | 12/1987 | Nakanowatari | G02F 1/13363 349/117 |
| 5,032,314 A | * | 7/1991 | Ushioda | C09K 19/3444 252/299.65 |
| 5,164,112 A | * | 11/1992 | Saito | C07C 69/007 252/299.6 |
| 5,676,881 A | * | 10/1997 | Takigawa | C07C 69/90 252/299.64 |
| 2004/0038408 A1 | * | 2/2004 | Abbott | G01N 21/75 435/287.1 |
| 2005/0189515 A1 | * | 9/2005 | Lee | C09K 19/30 252/299.61 |
| 2016/0122652 A1 | * | 5/2016 | Huang | C09D 179/08 523/456 |

OTHER PUBLICATIONS

Verma et al. "Detection of creatinine using surface-driven ordering transitions of liquid crystals" Liquid Crystals, 2016 vol. 43, No. 8, 1126-1134 (Year: 2016).*

Bi et al. "Real-Time Liquid Crystal pH Sensor for Monitoring Enzymatic Activities of Penicillinase" Adv. Funct. Mater. 2009, 19, 3760-3765 (Year: 2009).*

Kinsinger et al. "Reversible Control of Ordering Transitions at Aqueous/Liquid Crystal Interfaces Using Functional Amphiphilic Polymers" Adv. Mater. 2007, 19, 4208-4212 (Year: 2007).*

* cited by examiner

LIQUID CRYSTAL COMPOSITION, PH SENSING DEVICE USING THE SAME, AND PH SENSING DEVICE KIT USING THE SAME

CROSS-REFERENCE TO RELATED APPLICATION

This non-provisional application claims priority under 35 U.S.C. § 119(a) to Patent Application No. 105140512 filed in Taiwan, R.O.C. on Dec. 7, 2016, the entire contents of which are hereby incorporated by reference.

BACKGROUND

Technical Field

The present invention relates to a pH sensing technology, and particularly to a sensing device for pH sensing by using a liquid crystal composition.

Related Art

Sensors are identification elements having an identification capability and reacting merely with a specific substance. The sensors, such as electrochemical sensors, piezoelectric sensors, temperature sensors and so on, are designed based on a concept that a compound or energy is generated when a substance to be detected acts with an identification unit in the sensor, which is then converted into a physical signal (electrical, mechanical, optical or acoustic) by a transducer, and finally the physical signal is processed by a computer. Metal ions, genes, enzymes, bacteria, glucose, pesticides can be detected by sensors using liquid crystals. Compared with a commonly used detection means, the sensors using liquid crystals has the advantages of small volume, being portable, and rapid acquisition of the optical signal and thus the detection result from the sensor with no need of additional equipment. The detection mechanism of a sensor using liquid crystal is that after passing through different phases of liquid crystal, the polarized light is deflected by the liquid crystal and becomes light in different directions, so different optical signals are obtained.

For the detection of pH values, pH meters and universal test paper are the most commonly used in addition to the traditional acid-base titration. In pH meter, a composite electrode composed of a reference electrode and an indicator electrode is mainly used. When the electrode is placed in a solution having a different hydrogen ion concentration, the pH of the solution is measured by the change in the measured potential. The color of the universal test paper is changed by the dissociation or protonation of the reagent molecules at different pH levels, and then the pH of the environments is known from the different colors of the test paper.

SUMMARY

In an embodiment, a liquid crystal composition includes a nematic liquid crystal and a compound of Formula (I) where R is an alkyl, aryl, aralkyl or heteroaryl having 6 to 30 carbon atoms. The compound accounts for 0.3 to 0.6% of the liquid crystal composition.

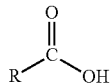

Formula (I)

In an embodiment, a sensing device includes a substrate, a frame, an alignment film, the liquid crystal composition as described above, and two polarizers. The frame is connected to the substrate and forms an accommodation space having an opening, and the alignment film and the liquid crystal composition are both located inside the accommodation space. One of the two polarizers is arranged in correspondence with the opening such that a channel exists between the polarizer and the frame, and the other polarizer is located at a lateral side of the substrate. In addition, the polarization directions of the two polarizers intersect with each other.

The liquid crystal composition and the sensing device of the present invention are useful in the measurement of the pH value of a flowing substance. The alignment direction of the liquid crystal is changed through the chemical reaction of the compound occurred at the interface between the liquid crystal composition and the flowing substance, such that the sensing device produces an optical change. Then, the optical change produced by the sensing device is observed visually or with the aid of an instrument, so as to measure the pH value of the flowing substance.

BRIEF DESCRIPTION OF THE DRAWINGS

Color Drawings

The patent or application file contains at least one drawing executed in color. Copies of this patent or patent application publication with color drawing(s) will be provided by the Office upon request and payment of the necessary fee.

DETAILED DESCRIPTION

In some embodiments, a liquid crystal composition may include a liquid crystal, and a dopant, for example, a compound of Formula (I). In Formula (I), R may be an alkyl, aryl, aralkyl or heteroaryl having 6 to 30 carbon atoms. The compound accounts for 0.3 to 0.6% (by weight) of the liquid crystal composition.

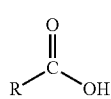

Formula (I)

In some embodiments, the liquid crystal may be a nematic liquid crystal. The nematic liquid crystal may be 4-cyano-4'-pentylbiphenyl (5CB), 4-cyano-4'-heptylbiphenyl (7CB), 4-cyano-4'-octylbiphenyl (8CB), 4-cyano-4'-oxyoctylbiphenyl, 4-cyano-4'-heptylterphenyl, other liquid crystals that may be used for replacement, or a combination thereof.

In some embodiments, the dopant may have an acid dissociation constant (pKa) ranging from 3.0 to 10.0, and preferably from 6.0 to 10.0. In some embodiments, the dopant may be a benzoic acid compound. In some embodiments, the dopant is one of the compounds having the following structures:

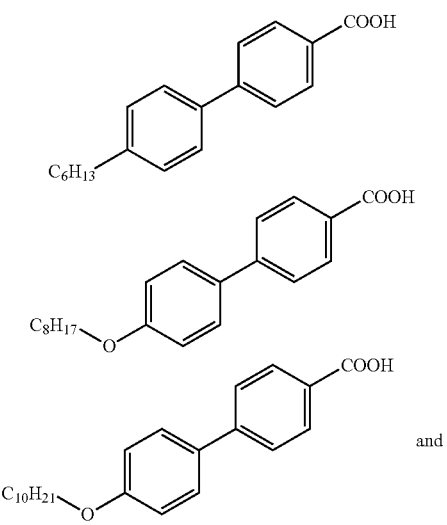

-continued

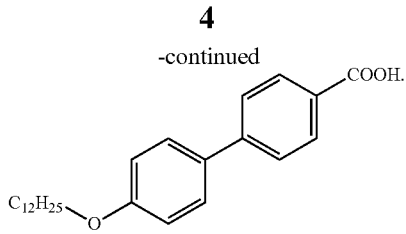

Figure 1:
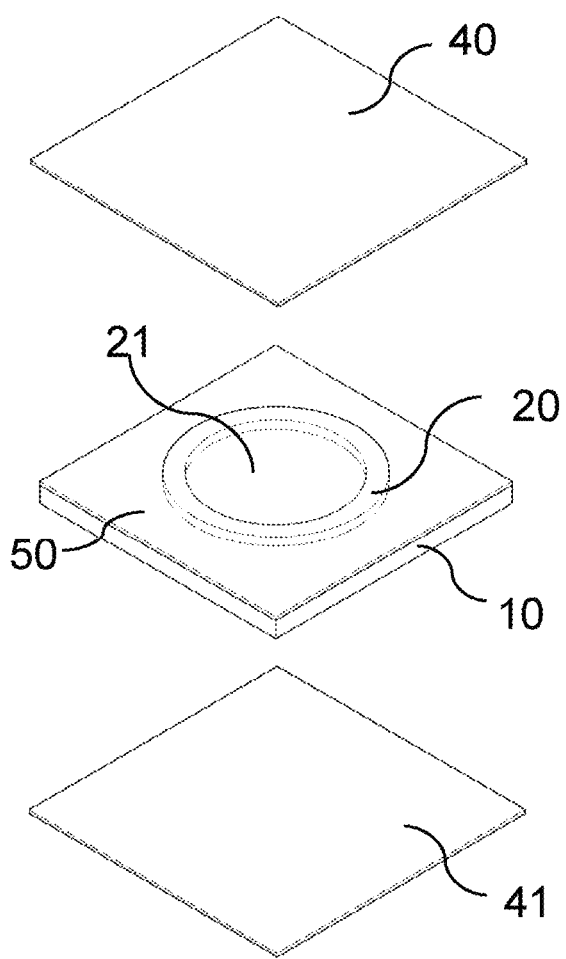
FIG. 1 is a schematic three-dimensional structural view of a sensing device according to an embodiment of the present invention.
Figure 2:
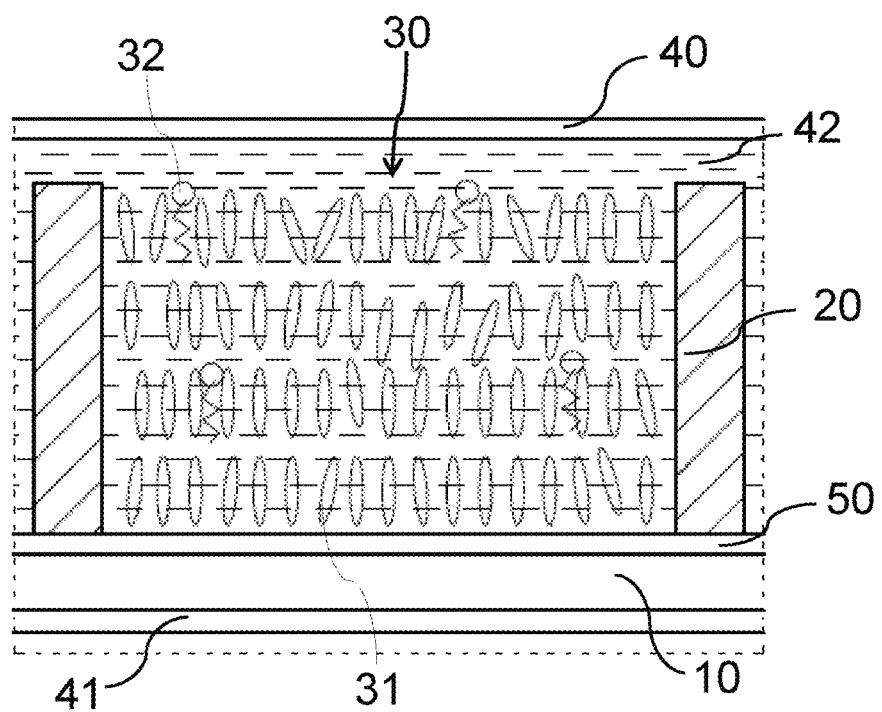
FIG. 2 is a side view of a sensing device according to an embodiment of the present invention when positioned in a flowing substance having a pH value higher than an acid dissociation constant of a dopant.
Figure 3:
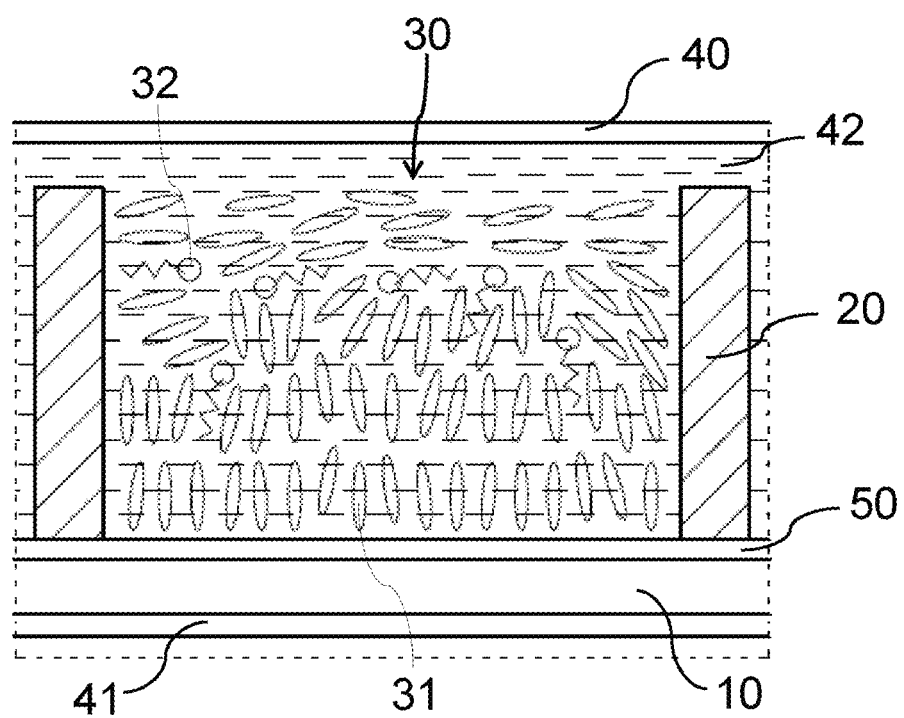
FIG. 3 is a side view of a sensing device according to an embodiment of the present invention when positioned in a flowing substance having a pH value lower than an acid dissociation constant of a dopant.

Referring to FIGS. 1 to 3, in some embodiments, a sensing device is provided, which is useful in the measurement of the pH value of a flowing substance that is in the range of 6.0 to 9.0. The sensing device includes a substrate 10, a frame 20, the liquid crystal composition 30 as described above, a first polarizer 40 and a second polarizer 41. The frame 20 is connected to the substrate 10, and forms an accommodation space 21 having an opening. The liquid crystal composition 30 having a liquid crystal 31 and a dopant 32 is located inside the accommodation space 21. The first polarizer 40 is arranged in correspondence with the opening such that a channel 42 through which a flowing substance passes exists between the polarizer and the frame 20. The second polarizer 41 is located at a lateral side of the substrate 10, and parallels to the first polarizer 40.

In an embodiment, the polarization directions of the first polarizer 40 and the second polarizer 41 intersect with (for example, are perpendicular to) each other. The alignment direction of the liquid crystal composition 30 may be or may not be perpendicular to (for example, parallels to) the two polarizers 40, 41. In some embodiments, the substrate 10 is made with a light permeable material. For example, the substrate 10 may be made with a material (for example, glass) permeable to visible light, or with a material permeable to IR light, UV light and/or other non-visible light. In addition, in some embodiments, the frame 20 may be made with a metal, and may also have multiple through holes provided to assist in fixing the location of the liquid crystal.

In some embodiments, the sensing device may further include an alignment film 50. The alignment film 50 may be arranged on a surface of the substrate 10. The alignment film 50 is partially located in the accommodation space 21 and contacts with the liquid crystal composition 30. In some embodiments, the alignment film 50 is just located on the surface of the substrate 10 that is inside the accommodation space 21. The alignment film 50 is generally made with dimethyloctadecyl[3-(trimethoxysilyl)propyl] ammonium-chloride (DMOAP), octyltrichlorosilane (OTS), polyimide (PI), other materials that may be used for replacement, or a combination thereof.

Figure 4:
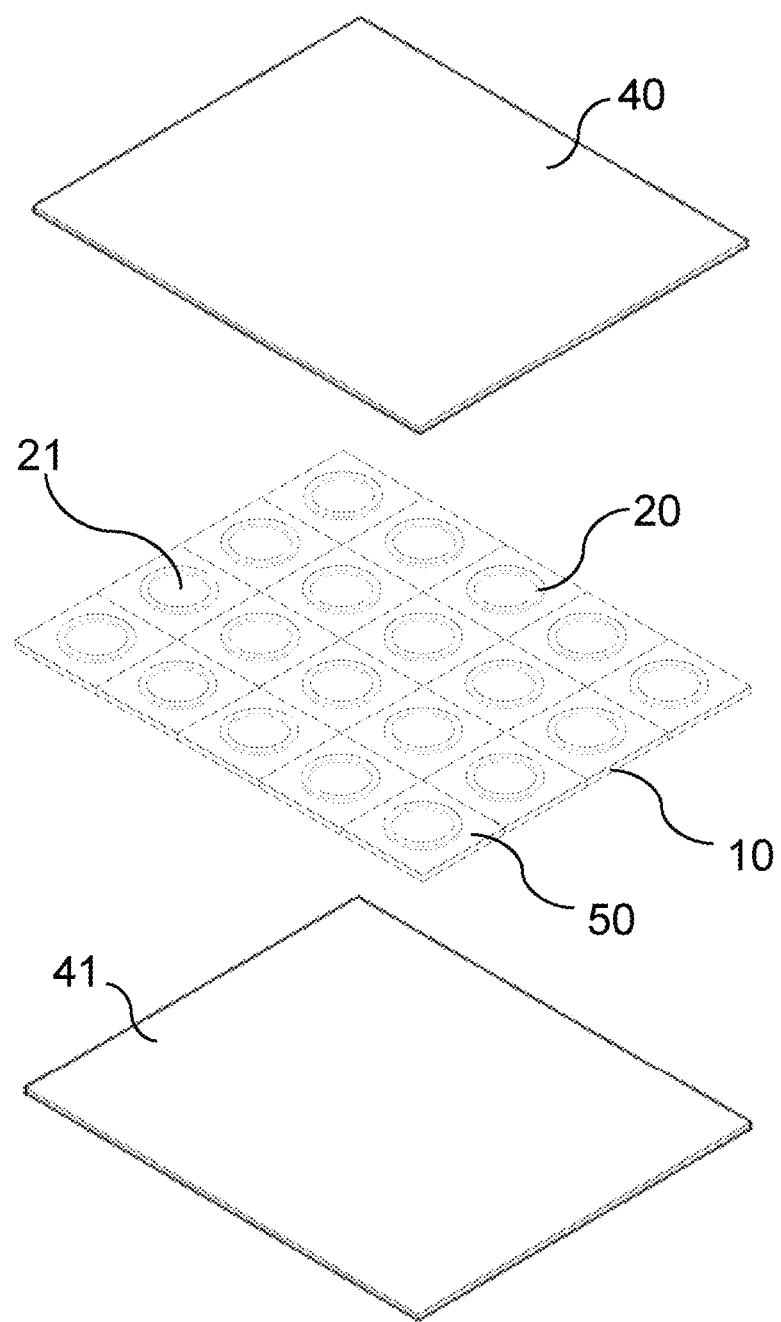
FIG. 4 is a schematic three-dimensional structural view of a sensing device having a plurality of accommodation spaces according to an embodiment of the present invention.
Figure 5:
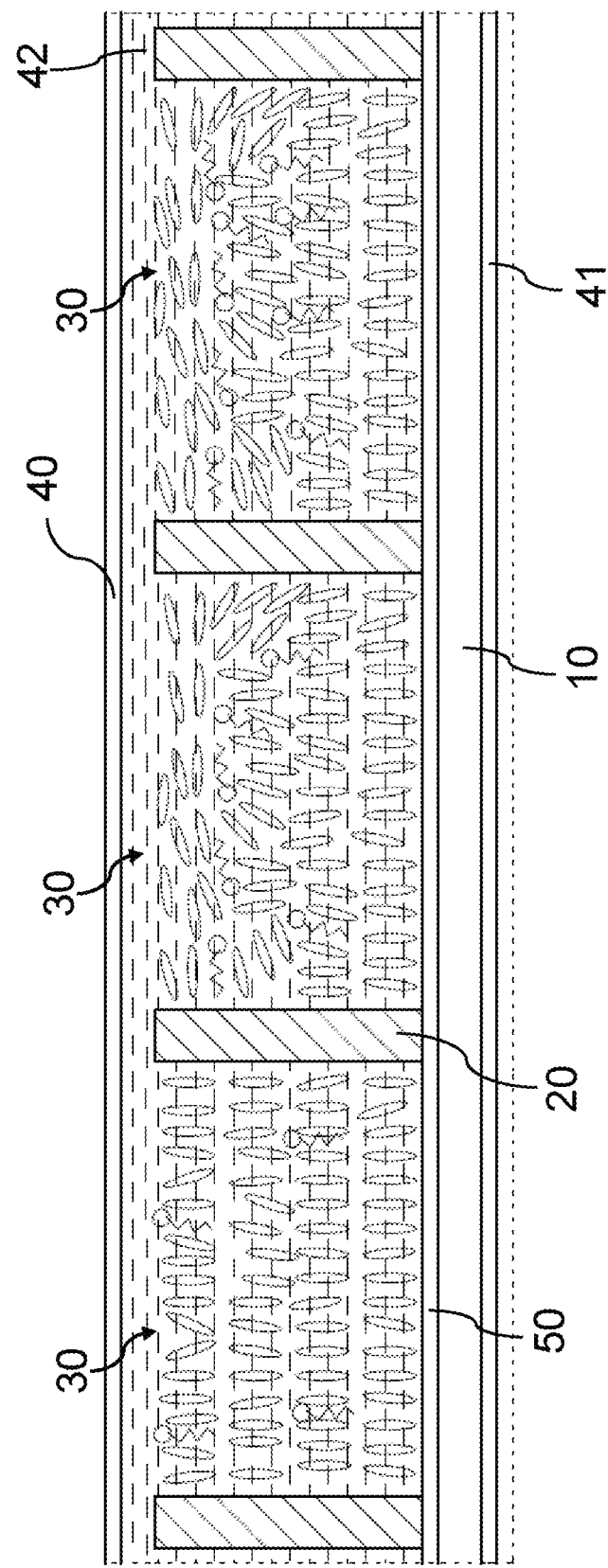
FIG. 5 is a schematic view of a sensing device having a plurality of accommodation spaces according to an embodiment of the present invention when positioned in a flowing substance.

Referring to FIGS. 4 and 5, in some embodiments, the substrate 10 and the frame 20 may form a plurality of accommodation spaces 21 having an opening, and the liquid crystal composition 30 may be located in some of the accommodation spaces 21. For example, the substrate 10 and the frame 20 may form two or more accommodation spaces 21 having an opening. In addition, one or more substrates 10 may be arranged. In other words, the accommodation spaces 21 may each be located on a respective substrate 10 or may all be located on the same substrate 10. Moreover, the frame 20 may be individually separately arranged or integrated. In an embodiment, the dopant 32 in the liquid crystal composition 30 in the accommodation spaces 21 may be the same, but present in a different proportion in respective liquid crystal composition 30. In an embodiment, the dopant 32 in the liquid crystal composition 30 in the accommodation spaces 21 may be different, but present in the same proportion in respective liquid crystal composition 30. In an embodiment, the dopant 32 in the liquid crystal composition 30 in at least two of accommodation spaces 21 may be the same, but present in a different proportion in respective liquid crystal composition 30. In an embodiment, the dopant 32 in the liquid crystal composition 30 in at least two of the accommodation spaces 21 may be different, but present in the same proportion in respective liquid crystal composition 30.

Referring back to FIGS. 2 and 3, in some embodiments, a flowing substance runs in the sensing device through the channel 42, flows into the accommodation space 21 and contacts with liquid crystal composition 30. When the liquid crystal composition 30 is in contact with the flowing substance, the dopant 32 undergoes chemical change in accordance with the pH value of the flowing substance. For example, when the pH value of the flowing substance is higher than the acid dissociation constant of the dopant 32, the carboxyl group of the dopant 32 dissociates to release a hydrogen ion therefrom, to form a negatively charged carboxylate. The liquid crystal 31 is induced to align orderly along a direction perpendicular to the first polarizer 40 and the second polarizer 41 on an interface between the liquid crystal 31 and the flowing substance, whereby the direction of the light penetrating the first polarizer 40 is maintained unchanged and cannot penetrate the second polarizer 41, such that the sensing device has a low transmittance. When the pH value of the flowing substance is lower than the acid dissociation constant of the dopant 32, the carboxyl group of the dopant 32 does not undergo dissociation and the hydrophobicity is maintained, such that liquid crystal 31 is difficult to align orderly. As a result, the direction of the light travelling through the first polarizer 40 is changed, and some light is permitted to penetrate the second polarizer 41, whereby the sensing device has a high transmittance.

Figure 6:
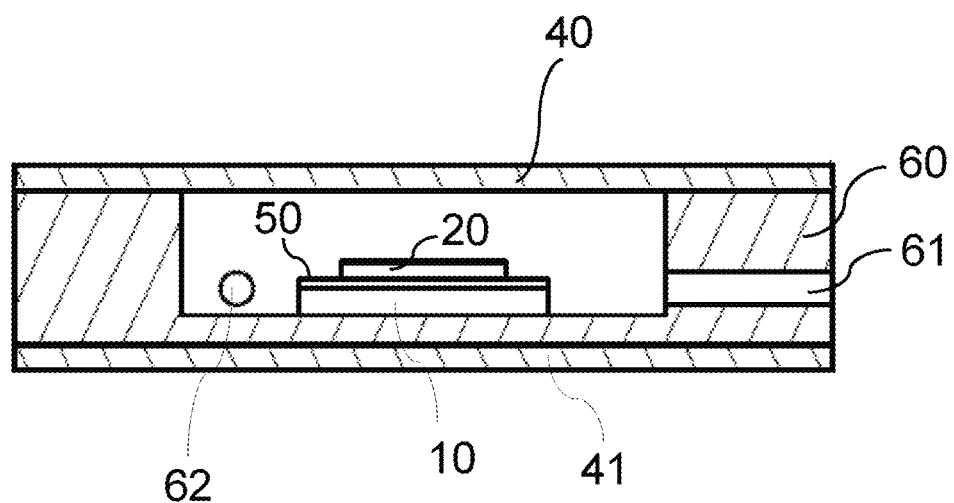
FIG. 6 is a schematic structural view of a sensing device having a casing according to an embodiment of the present invention.

Referring to FIG. 6, in some embodiments, the sensing device further includes a casing 60. The casing 60 may accommodate the substrate 10, the frame 20, the first polarizer 40, and the second polarizer 41, and has an inlet 61 and an outlet 62 through which the flowing substance flows in and out. The casing 60 may be made with a transparent and flexible polymer material, for example, polydimethylsiloxane (PDMS).

Figure 7:
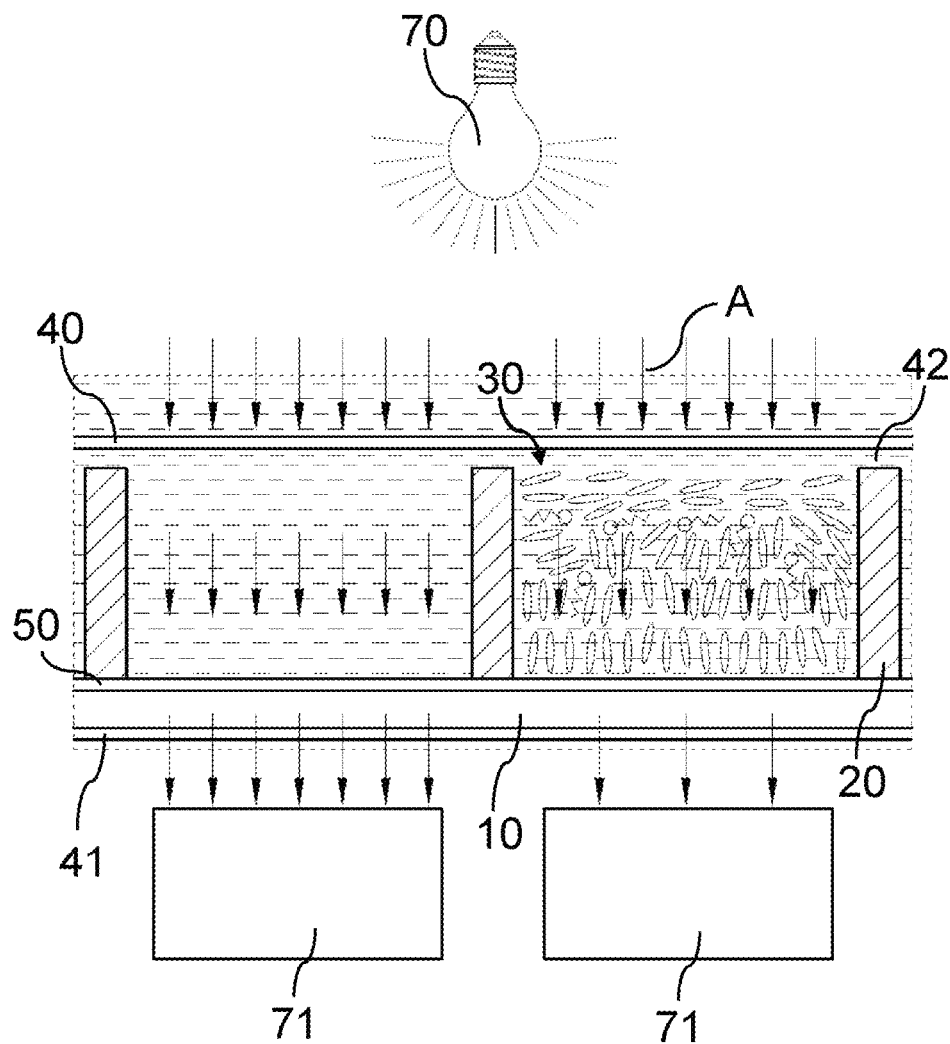
FIG. 7 is a schematic structural view of a sensing device having a light source and light sensors according to an embodiment of the present invention.
Figure 8A:
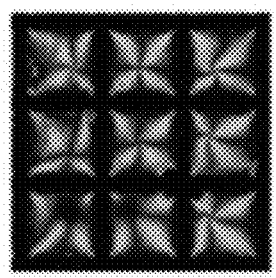
FIGS. 8(a) to 8(g), 9(a) to 9(g), 10(a) to 10(g) and 11(a) to 11(g) show optical signals produced when sensing devices containing a liquid crystal composition blended with a particular proportion of a different dopant are positioned in solutions having different pH values respectively.
Figure 8B:
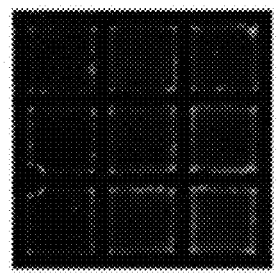
Figure 8C:
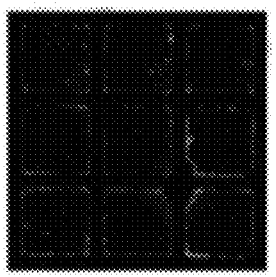
Figure 8D:
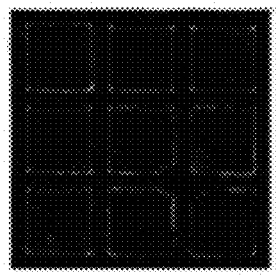
Figure 8E:
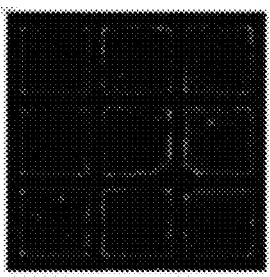
Figure 8F:
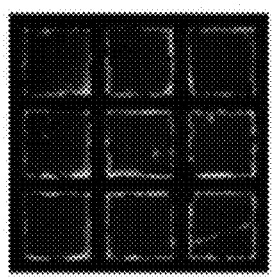
Figure 8G:
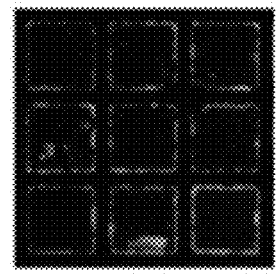
Figure 9A:
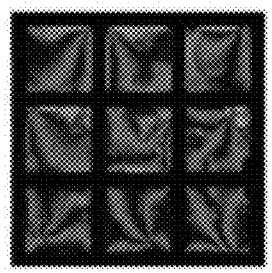
Figure 9B:
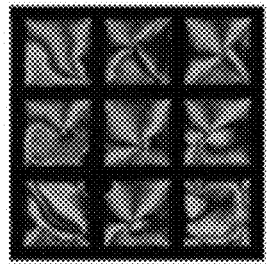
Figure 9C:
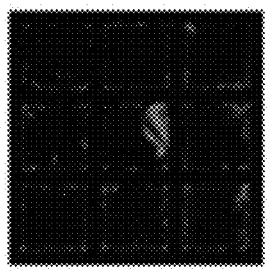
Figure 9D:
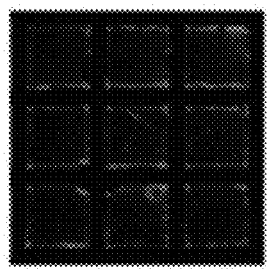
Figure 9E:
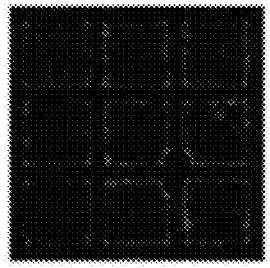
Figure 9F:
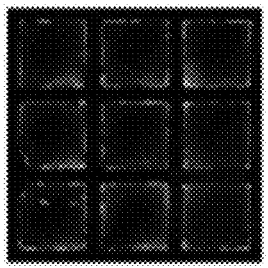
Figure 9G:
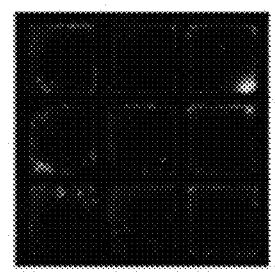
Figure 10A:
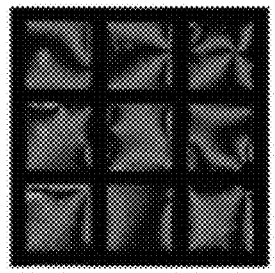
Figure 10B:
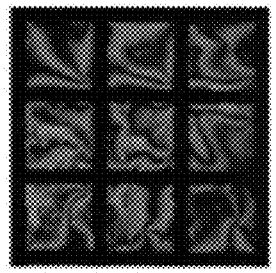
Figure 10C:
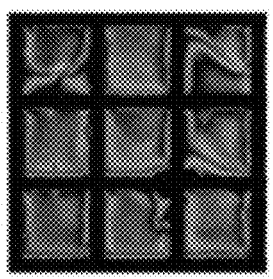
Figure 10D:
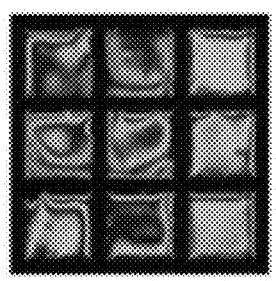
Figure 10E:
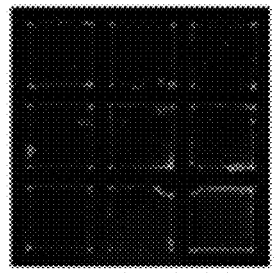
Figure 10F:
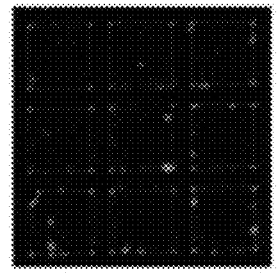
Figure 10G:
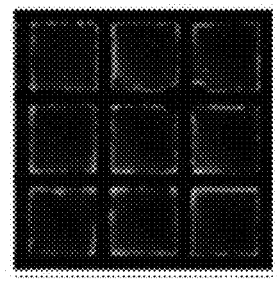
Figure 11A:
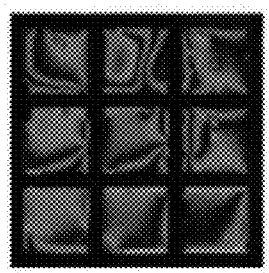
Figure 11B:
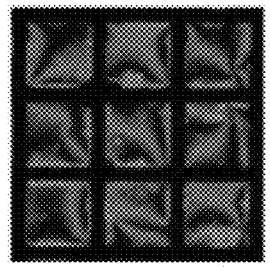
Figure 11C:
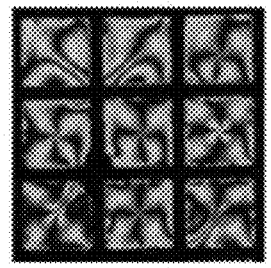
Figure 11D:
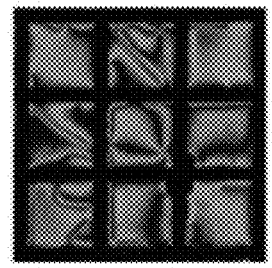
Figure 11E:
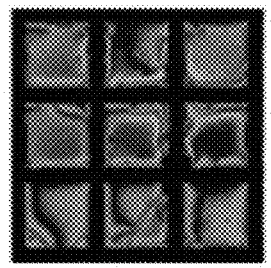
Figure 11F:
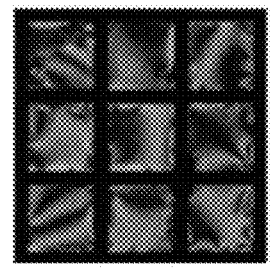
Figure 11G:
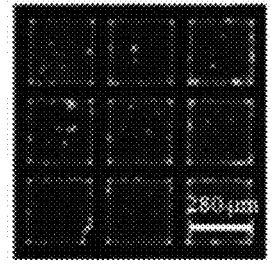
Figure 12A:
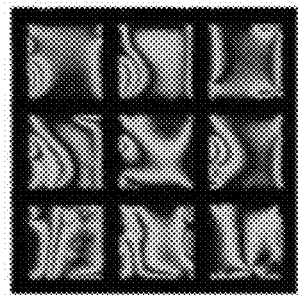
FIGS. 12(a) to 12(f), 13(a) to 13(f), FIGS. 14(a) to 14(f), and FIGS. 15(a) to 15(f) show optical signals produced when sensing devices containing a liquid crystal composition blended with a different proportion of a particular dopant are positioned in solutions having different pH values respectively.
Figure 12B:
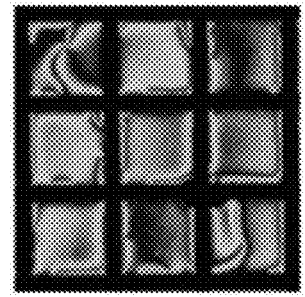
Figure 12C:
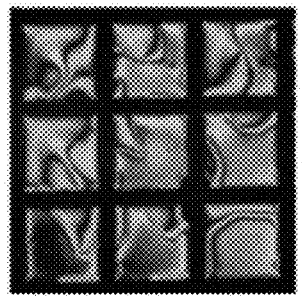
Figure 12D:
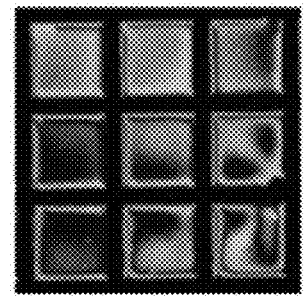
Figure 12E:
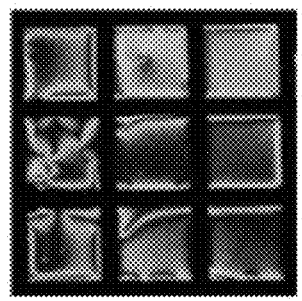
Figure 12F:
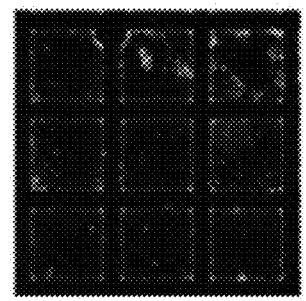
Figure 13A:
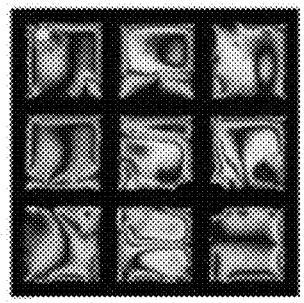
Figure 13B:
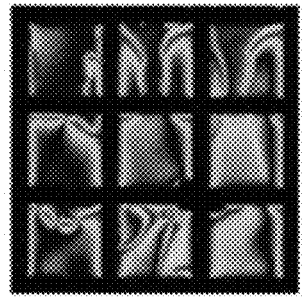
Figure 13C:
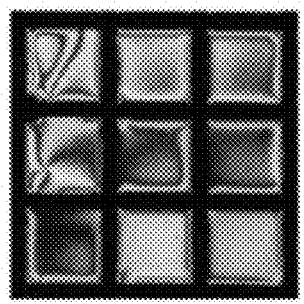
Figure 13D:
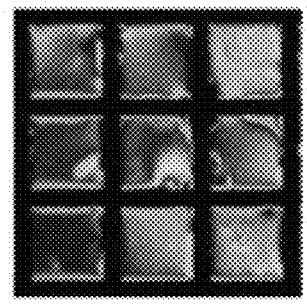
Figure 13E:
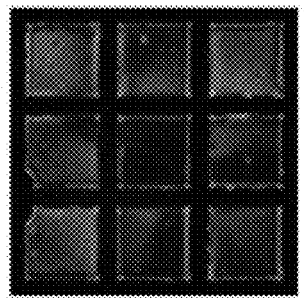
Figure 13F:
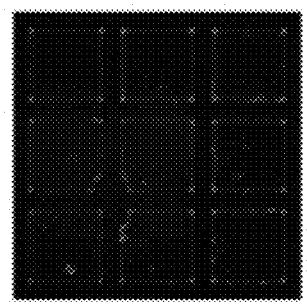
Figure 14A:
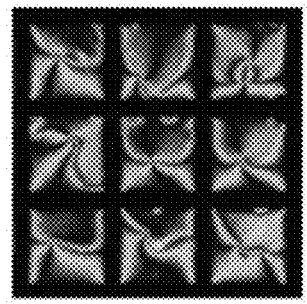
Figure 14B:
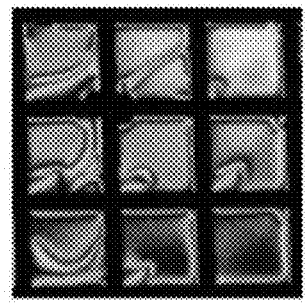
Figure 14C:
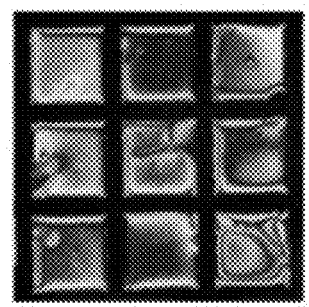
Figure 14D:
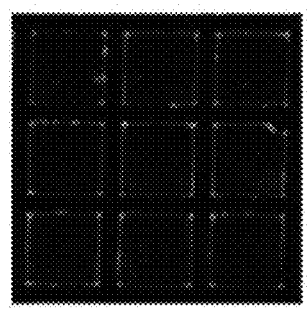
Figure 14E:
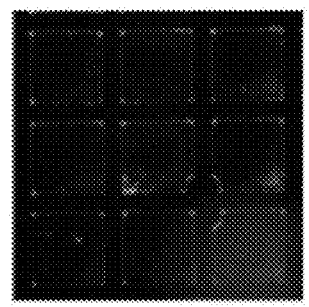
Figure 14F:
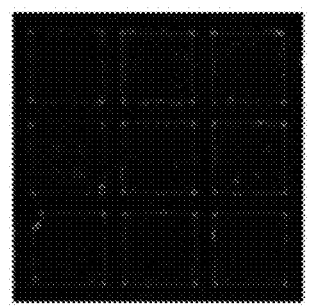
Figure 15A:
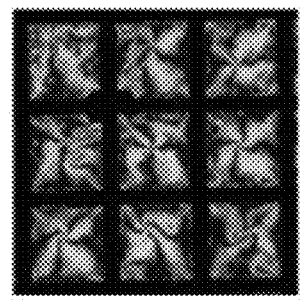
Figure 15B:
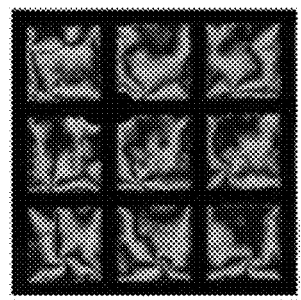
Figure 15C:
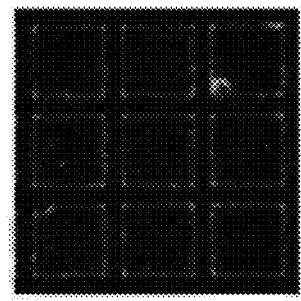
Figure 15D:
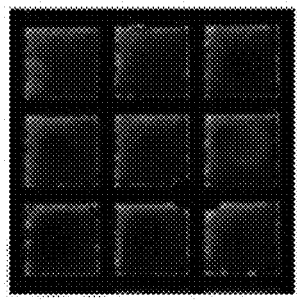
Figure 15E:
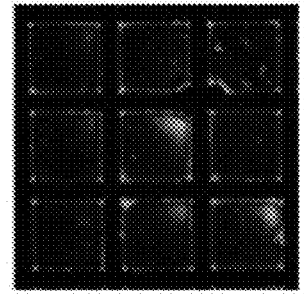
Figure 15F:
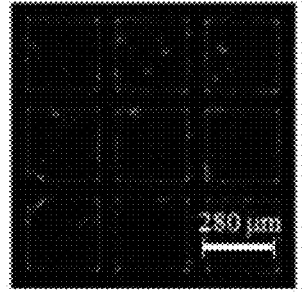

Referring to FIG. 7, the sensing device according to any of the embodiments of the present invention may further contain a material having a predetermined transmittance. For example, the substrate 10 and the frame 20 may form a plurality of accommodation spaces having an opening, and one of the accommodation spaces contains no the liquid crystal composition 30. The remaining accommodation spaces individually contain the liquid crystal composition 30. In this case, due to the absence of the influence from the change in the alignment direction of the liquid crystal composition 30, the light transmittance through the accommodation space containing no the liquid crystal composition 30 may be a fixed value. The sensing device is placed in the flowing substance to be determined and the flowing substance is allowed to contact the liquid crystal composition 30 in the sensing device, such that the dopant 32 in the liquid crystal composition 30 undergoes changes in accordance with the pH value of the flowing substance, and induces the liquid crystal 31 to change its alignment direction, thereby altering the transmittance of the sensing device.

In an embodiment, the sensing device may further include a light source 70 and light sensors 71 located at two opposite sides of the first polarizer 40 and the second polarizer 41. The light sensors 71 correspond to the accommodation space containing no the liquid crystal composition 30 and the remaining accommodation spaces containing the liquid crystal composition 30 respectively. The light source 70 emits light A towards the light sensors 71. When the light A penetrates through the sensing device, the pH value of the flowing substance is detected by comparing the transmittance of the accommodation space containing no the liquid crystal composition 30 vs the remaining accommodation spaces containing the liquid crystal composition 30.

For example, the method for fabricating the sensing device may include the following processes.

1. Preparation of Substrate

A slide (that is, substrate) is soaked for 12 hrs in a Decon-90 solution. Then, the slide is flushed 5 times with deionized water. After each flushing of the slide, the slide is ultrasonically shaken for 15 min in water. Next, the slide is flushed 2 times with deionized water, and dried by blowing with nitrogen. Then, the slide is soaked for 8 min in a 0.1% (v/v) dimethyloctadecyl[3-(trimethoxysilyl)propyl] ammoniumchloride (DMOAP) solution. Finally, the soaked slide is flushed with deionized water and dried by blowing with nitrogen. The slide is dried for 15 min in a vacuum oven at 100° C., to obtain a slide with an alignment film of dimethyloctadecyl[3-(trimethoxysilyl)propyl] ammoniumchloride (referred to as "DMOAP-substrate" hereinafter).

2. Preparation of Frame

A copper mesh is soaked in containers containing methanol, ethanol, acetone, and other solvents in sequence. At each soaking, the container is ultrasonically shaken for 15 min in water. After the ultrasonic shaking, the solvent is decanted off, and the copper mesh is dried in an oven at 100° C., to obtain a frame. In addition, the frame has multiple through grids for reinforcing and fixing the location of the liquid crystal 3. Preparation of Liquid Crystal Composition Powdered compounds of Formulas (I-1), (I-2), (I-3) and (I-4) are dissolved in 4-cyano-4'-pentylbiphenyl (that is, liquid crystal) respectively, to form a liquid crystal composition. The compound exists as a dopant in the liquid crystal composition, and is present in the liquid crystal composition in an amount of 0.3 to 0.6% by weight. The acid dissociation constants (pKa) of the compounds of Formulas (I-1), (I-2), (I-3) and (I-4) are respectively 7.6789, 7.6609, 9.7711, and 8.73525.

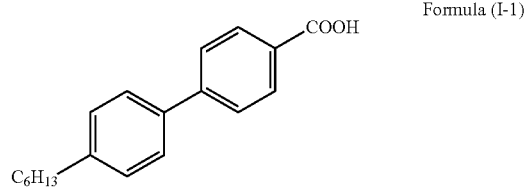

Formula (I-1)

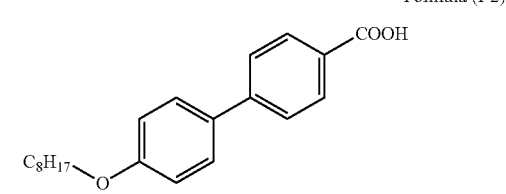

Formula (I-2)

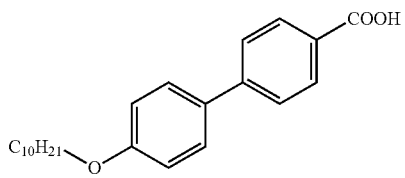

Formula (I-3)

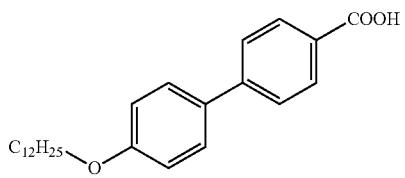

Formula (I-4)

4. Preparation of Sensing Device

The DMOAP-substrate is cut to have a size of 0.5 cm×0.5 cm, on which the frame is positioned. The liquid crystal composition prepared (about 0.25 μl) is drawn with a micropipette and filled in the grid of the frame. A casing having internal space of about 10 mm×25 mm×5 mm is prepared with polydimethylsiloxane. The casing has an inlet and an outlet through which the flowing substance passes. The prepared substrate and the frame filled with the liquid crystal composition are placed in the space of the casing, and two polarizers are arranged and secured at two sides of the casing, to obtain a sensing device. The polarization directions of the two polarizers are perpendicular. The liquid crystal in the liquid crystal composition may be aligned orderly along a direction perpendicular to the two polarizers.

Referring to FIGS. 8(*a*) to 8(*g*), 9(*a*) to 9(*g*), FIGS. 10(*a*) to 10(*g*), and 11(*a*) to 11(*g*), sensing devices containing the liquid crystal composition blended with 0.3% of the compound of Formula (I-1), (I-2), (I-3), or (I-4) are positioned in solutions having different pH values respectively. The light transmittance of the sensing devices in the solutions having different pH values are observed under a microscope, to obtain corresponding optical signals. FIGS. 8(*a*) to 8(*g*) show optical signals obtained from a sensing device containing the liquid crystal composition blended with 0.3% of the compound of Formula (I-1) positioned in a solution of pH 6.8, pH 7.0, pH 7.2, pH 7.4, pH 7.6, pH 8.0, and pH 8.2 respectively. FIGS. 9(*a*) to 9(*g*) show optical signals obtained from a sensing device containing the liquid crystal composition blended with 0.3% of the compound of Formula (I-2) positioned in a solution of pH 6.8, pH 7.0, pH 7.2, pH 7.4, pH 7.6, pH 8.0, and pH 8.2 respectively. FIGS. 10(*a*) to 10(*g*) show optical signals obtained from a sensing device containing the liquid crystal composition blended with 0.3% of the compound of Formula (I-3) positioned in a solution of pH 6.8, pH 7.0, pH 7.2, pH 7.4, pH 7.6, pH 8.0, and pH 8.2 respectively. FIGS. 11(*a*) to 11(*g*) show optical signals obtained from a sensing device containing the liquid crystal composition blended with 0.3% of the compound of Formula (I-4) positioned in a solution of pH 6.8, pH 7.0, pH 7.2, pH 7.4, pH 7.6, pH 8.0, and pH 8.2 respectively.

As can be known from the figures, when the liquid crystal composition contained in the sensing device is blended with 0.3% of the compound of Formula (I-1), the sensing device produces a dark optical signal when positioned in a solution of pH 7 or above. When the liquid crystal composition contained in the sensing device is blended with 0.3% of the compound of Formula (I-2), the sensing device produces a dark optical signal when positioned in a solution of pH 7.2 or above. When the liquid crystal composition contained in the sensing device is blended with 0.3% of the compound of Formula (I-3), the sensing device produces a dark optical signal when positioned in a solution of pH 7.6 or above. When the liquid crystal composition contained in the sensing device is blended with 0.3% of the compound of Formula (I-4), the sensing device produces a dark optical signal when positioned in a solution of pH 8.2 or above.

Herein, if the pH value of the solution is lower than the acid dissociation constant of the compound (that is, dopant) in the liquid crystal composition, because the acid group of the compound does not undergo dissociation into a negatively charged carboxylate and the hydrophobicity is maintained, the alignment direction of the liquid crystal is changed due to the interference from the hydrophobic dopant. Because of the change in the alignment direction of the liquid crystal, the light is allowed to penetrate the sensing device and a bright optical signal is produced. When the pH value of the solution is higher than the acid dissociation constant of the compound, the acid group of the compound is dissociated into a negatively charged carboxylate and the compound forms an amphiphilic molecule with a hydrophilic end. By means of the amphiphilicity of the compound, the liquid crystal is induced to stably align orderly in the solution, such that the light penetrating one of the polarizers cannot penetrate the other polarizer, and thus the sensing device produce a dark optical signal.

Referring to FIGS. 12(*a*) to 12(*f*), 13(*a*) to 13(*f*), 14(*a*) to 14(*f*), and 15(*a*) to 15(*f*), sensing devices containing the liquid crystal composition blended with 0.3%, 0.4%, 0.5%, and 0.6% of the compound of Formula (I-1) are positioned in solutions having different pH values respectively. The light transmittance of the sensing devices in the solutions having different pH values are observed under a microscope, to obtain corresponding optical signals. FIGS. 12(*a*) to 12(*f*) show optical signals obtained from a sensing device containing the liquid crystal composition blended with 0.3% of the compound of Formula (I-1) positioned in a solution of pH 6.0, pH 6.2, pH 6.4, pH 6.6, pH 6.8 and pH 7.0 respectively. FIGS. 13(*a*) to 13(*f*) show optical signals obtained from a sensing device containing the liquid crystal composition blended with 0.4% of the compound of Formula (I-1) positioned in a solution of pH 6.0, pH 6.2, pH 6.4, pH 6.6, pH 6.8 and pH 7.0 respectively. FIGS. 14(*a*) to 14(*f*) show optical signals obtained from a sensing device containing the liquid crystal composition blended with 0.5% of the compound of Formula (I-1) positioned in a solution of pH 6.0, pH 6.2, pH 6.4, pH 6.6, pH 6.8 and pH 7.0 respectively. FIGS. 15(*a*) to 15(*f*) show optical signals obtained from a sensing device containing the liquid crystal composition blended with 0.6% of the compound of Formula (I-1) positioned in a solution of pH 6.0, pH 6.2, pH 6.4, pH 6.6, pH 6.8 and pH 7.0 respectively.

As can be known from the figures, when the liquid crystal composition contained in the sensing device is blended with 0.3% of the compound of Formula (I-1), the sensing device produces a dark optical signal when positioned in a solution of pH 6.8 or above. When the liquid crystal composition contained in the sensing device is blended with 0.4% of the compound of Formula (I-1), the sensing device produces a dark optical signal when positioned in a solution of pH 6.8 or above. When the liquid crystal composition contained in the sensing device is blended with 0.5% of the compound of Formula (I-1), the sensing device produces a dark optical signal when positioned in a solution of pH 6.6 or above. When the liquid crystal composition contained in the sensing device is blended with 0.6% of the compound of Formula (I-1), the sensing device produces a dark optical signal when positioned in a solution of pH 6.4 or above.

Herein, when the proportion of the compound in the liquid crystal composition is higher, a pH value at which the sensing device produces an optical signal change is lower. In other words, when the proportion of the compound blended in the liquid crystal composition is higher, a change resulting from a lower pH value in the solution can be identified. With varying proportion of the compound blended, the number of the compound having an acid group dissociated into a carboxylate in the solutions having different pH values is also different, such that the changes in the alignment direction of the liquid crystal ingredient and in the light transmittance differ to some extent. Therefore, the sensing device can produce corresponding optical signals with respect to different pH values of the solution.

Figure 16A:
FIGS. 16(a) to 16(f) show optical signals produced when four sensing devices containing a liquid crystal composition blended with a particular proportion of a different dopant are positioned in solutions having different pH values at the same time.
Figure 16B:
Figure 16C:
Figure 16D:
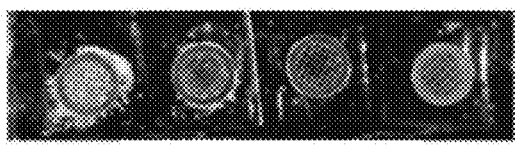
Figure 16E:
Figure 16F:
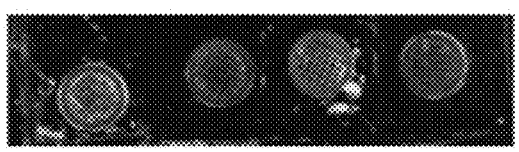

Referring to FIGS. 16(a) to 16(f), four sensing devices containing the liquid crystal composition blended with 0.3% of the compound of Formula (I-1), (I-2), (I-3), or (I-4) (from right to left) are positioned in solutions having different pH values respectively. The light transmittance of the sensing devices in the solutions having different pH values are observed under a microscope, to obtain corresponding optical signals. FIG. 16(a) shows optical signals obtained from the four sensing devices positioned in a solution of pH 6.8. FIG. 16(b) shows optical signals obtained from the four sensing devices positioned in a solution of pH 7.0. FIG. 16(c) shows optical signals obtained from the four sensing devices positioned in a solution of pH 7.2. FIG. 16(d) shows optical signals obtained from the four sensing devices positioned in a solution of pH 7.4. FIG. 16(e) shows optical signals obtained from the four sensing devices positioned in a solution of pH 7.6. FIG. 16(f) shows optical signals obtained from the four sensing devices positioned in a solution of pH 7.8.

As can be known from the figures, in the solution of pH 6.8, the four sensing devices all produce a bright optical signal. In the solution of pH 7.0, the sensing device containing the liquid crystal composition blended with 0.3% of the compound of Formula (I-1) produces a dark optical signal, and the remaining three sensing devices all produce a bright optical signal. In the solution of pH 7.2, the two sensing devices containing the liquid crystal composition blended with 0.3% of the compound of Formula (I-1) and the liquid crystal composition blended with 0.3% of the compound of Formula (I-2) both produce a dark optical signal, and the remaining two sensing device produce a bright optical signal. In the solutions of pH 7.4 and 7.6, the sensing device containing the liquid crystal composition blended with 0.3% of the compound of Formula (I-4) produces a bright optical signal, and the remaining three sensing devices all produce a dark optical signal. In the solution of pH 7.8, the four sensing devices all produce a dark optical signal. Therefore, the sensing devices containing the liquid crystal compositions having different compounds can be positioned in a flowing substance, and the pH value of the flowing substance is determined according to the difference between the optical signals from the sensing devices.

Figure 17A:
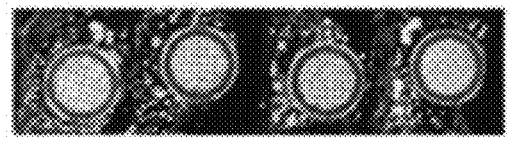
FIGS. 17(a) to 17(g) show optical signals produced when four sensing devices containing a liquid crystal composition blended with a different proportion of a particular dopant are positioned in solutions having different pH values at the same time.
Figure 17B:
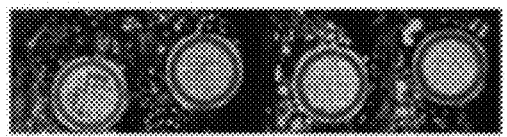
Figure 17C:
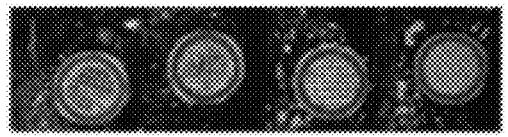
Figure 17D:
Figure 17E:
Figure 17F:
Figure 17G:

Referring to FIGS. 17(a) to 17(g), four sensing devices containing the liquid crystal composition blended with 0.3%, 0.4%, 0.5%, and 0.6% of the compound of Formula (I-1) are positioned in solutions of pH 6.0, pH 6.2, pH 6.4, pH 6.6, pH 6.8, pH 7.0 and pH 7.2 respectively. The light transmittance of the sensing devices in the solutions having different pH values are observed under a microscope, to obtain corresponding optical signals. FIG. 17(a) shows optical signals obtained from the four sensing devices positioned in a solution of pH 6.0. FIG. 17(b) shows optical signals obtained from the four sensing devices positioned in a solution of pH 6.2. FIG. 17(c) shows optical signals obtained from the four sensing devices positioned in a solution of pH 6.4. FIG. 17(d) shows optical signals obtained from the four sensing devices positioned in a solution of pH 6.6. FIG. 17(e) shows optical signals obtained from the four sensing devices positioned in a solution of pH 6.8. FIG. 17(f) shows optical signals obtained from the four sensing devices positioned in a solution of pH 7.0. FIG. 17(g) shows optical signals obtained from the four sensing devices positioned in a solution of pH 7.2.

As can be known from the figures, in the solution of pH 6.0, the four sensing devices all produce a bright optical signal. In the solution of pH 6.2, the sensing device containing the liquid crystal composition blended with 0.6% of the compound of Formula (I-1) produces a dark optical signal, and the remaining three sensing devices all produce a bright optical signal. In the solutions of pH 6.4 and 6.6, the two sensing devices containing the liquid crystal composition blended with 0.6% of the compound of Formula (I-1) and the liquid crystal composition blended with 0.5% of the compound of Formula (I-1) both produce a dark optical signal, and the remaining two sensing devices produce a bright optical signal. In the solutions of pH 6.8 and 7.0, the sensing device containing the liquid crystal composition blended with 0.3% of the compound of Formula (I-1) produces a bright optical signal, and the remaining three sensing devices all produce a dark optical signal. In the solution of pH 7.2, the four sensing devices all produce a dark optical signal. Therefore, the sensing devices containing the liquid crystal compositions having the same compound which is blended in different proportions can be positioned in a flowing substance, and the pH value of the flowing substance is determined according to the difference between the optical signals from the sensing devices.

In summary, the liquid crystal composition and the sensing device of the present invention are useful in the measurement of the pH value of a flowing substance. The alignment direction of the liquid crystal is changed by the chemical reaction of the compound in the liquid crystal composition with the flowing substance, such that the sensing device produces an optical change. Then, the optical change produced by the sensing device is observed visually or with the aid of an instrument, so as to measure the pH value of the flowing substance. Moreover, because a carboxyl group can be formed again through protonation after the carboxyl group of the compound is dissociated into a carboxylate, the sensing device can produce a bright or dark optical signal repeatedly. Therefore, the sensing device can reflect the change in the pH value of a flowing substance in real time, and thus is applicable to the monitoring of the pH value of the flowing substance in long term.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A liquid crystal composition, comprising:
   a nematic liquid crystal; and
   a compound selected from a group consisting of Formula (I-1), (I-2), (I-3), and (I-4),

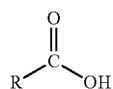

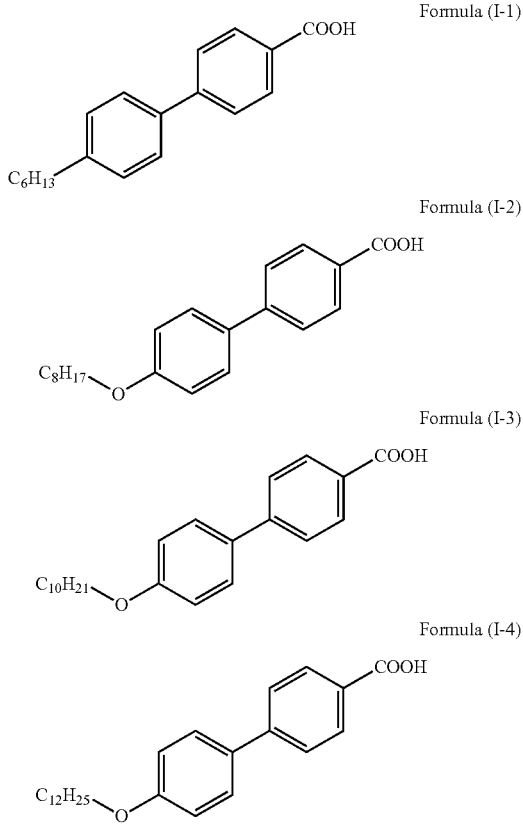

wherein Formula (I-1) accounts for 0.4 to 0.6% of the liquid crystal composition, Formula (I-2) accounts for 0.3 to 0.6% of the liquid crystal composition; Formula (I-3) accounts for 0.3 to 0.6% of the liquid crystal composition; Formula (I-4) accounts for 0.3 to 0.6% of the liquid crystal composition.

2. The liquid crystal composition according to claim 1, wherein the compound has an acid dissociation constant ranging from 3.0 to 10.0.

3. The liquid crystal composition according to claim 1, wherein the compound has an acid dissociation constant ranging from 6.0 to 10.0.

4. The liquid crystal composition according to claim 1, wherein the compound is a benzoic acid compound.

5. The liquid crystal composition according to claim 1, wherein the nematic liquid crystal is at least one selected from the group consisting of 4-cyano-4'-pentylbiphenyl, 4-cyano-4'-heptylbiphenyl, 4-cyano-4'-octylbiphenyl, 4-cyano-4'-octyloxybiphenyl, and 4-cyano-4'-heptylterphenyl.

6. A pH sensing device, comprising:
   a substrate;
   a frame, connected to the substrate and forming an accommodation space having an opening;
   an alignment film, located inside the accommodation space;
   a liquid crystal composition according to claim 1, located inside the accommodation space; and
   two polarizers, wherein one of the polarizers is arranged in correspondence with the opening such that a channel exists therebetween, the other polarizer is located at a lateral side of the substrate, and the polarization directions of the two polarizers are staggered with each other.

7. The pH sensing device according to claim 6, wherein the compound of the liquid crystal composition has an acid dissociation constant ranging from 3.0 to 10.0.

8. The pH sensing device according to claim 6, wherein the compound of the liquid crystal composition has an acid dissociation constant ranging from 6.0 to 10.0.

9. The pH sensing device according to claim 6, wherein the compound of the liquid crystal composition is a benzoic acid compound.

10. The pH sensing device according to claim 6, wherein the nematic liquid crystal of the liquid crystal composition is at least one selected from the group consisting of 4-cyano-4'-pentylbiphenyl, 4-cyano-4'-heptylbiphenyl, 4-cyano-4'-octylbiphenyl, 4-cyano-4'-octyloxybiphenyl, and 4-cyano-4'-heptylterphenyl.

11. The pH sensing device according to claim 6, further comprising:
    a casing, for accommodating the substrate, the frame, and the polarizers, and having an outlet and an inlet.

12. The pH sensing device according to claim 6, wherein the frame and the substrate form a plurality of the accommodation spaces having an opening, the liquid crystal composition is individually located in the accommodation spaces, and the compound in the liquid crystal composition located in each of the accommodation spaces is the same, but present in a different proportion in respective liquid crystal composition.

13. The pH sensing device according to claim 6, wherein the frame and the substrate form a plurality of the accommodation spaces having an opening, the liquid crystal composition is individually located in the accommodation spaces, and the compound in the liquid crystal composition located in each of the accommodation spaces is different, but present in the same proportion in respective liquid crystal composition.

14. The pH sensing device according to claim 6, wherein the frame and the substrate form a plurality of the accommodation spaces having an opening, the liquid crystal composition is individually located in the accommodation spaces, and the compound in the liquid crystal composition located in at least two of the accommodation spaces is the same, but present in a different proportion in respective liquid crystal composition.

15. The pH sensing device according to claim 6, wherein the frame and the substrate form a plurality of the accommodation spaces having an opening, the liquid crystal composition is individually located in the accommodation spaces, and the compound in the liquid crystal composition located in at least two of the accommodation spaces is different, but present in the same proportion in respective liquid crystal composition.

16. The pH sensing device according to claim 6, wherein the frame and the substrate form a plurality of the accommodation spaces having an opening, one of the accommodation spaces contains no the liquid crystal composition, and the remaining accommodation spaces individually contain the liquid crystal composition; the substrate is made with a light permeable material; and the pH sensing device further comprises a light source and two light sensors, wherein the light source and the light sensors are located respectively at two opposite sides of the polarizers, the light sensors correspond respectively to the accommodation space containing no liquid crystal composition and the accommodation spaces containing the liquid crystal composition, and the light source emits light towards the light sensors.

17. The pH sensing device according to claim 11, wherein the casing is made with a polymeric material.

18. A pH sensing device kit, comprising:
a plurality of the pH sensing devices, wherein each of the pH sensing devices comprises:
  a substrate;
  a frame, connected to the substrate and forming an accommodation space having an opening;
  an alignment film, located inside the accommodation space;
  two polarizers, wherein one of the polarizers is arranged in correspondence with the opening such that a channel exists therebetween, the other polarizer is located at a lateral side of the substrate, and the polarization directions of the two polarizers are staggered with each other; and
  a liquid crystal composition, located inside the accommodation space, wherein the liquid crystal composition comprises:
    nematic liquid crystal; and
    a compound selected from a group consisting of Formula (I-1), (I-2), (I-3), and (I-4),

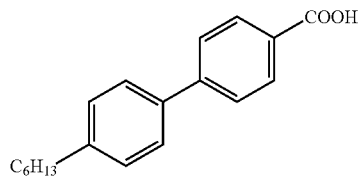
Formula (I-1)

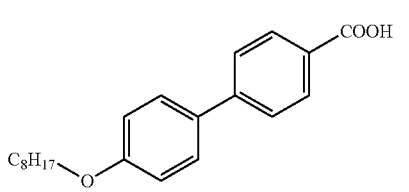
Formula (I-2)

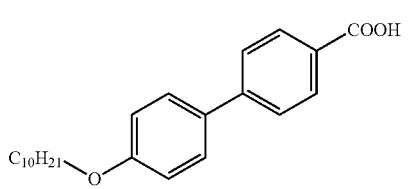
Formula (I-3)

-continued

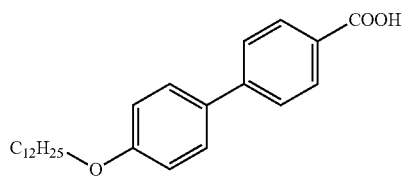
Formula (I-4)

wherein Formula (I-1) accounts for 0.4 to 0.6% of the liquid crystal composition; Formula (I-2) accounts for 0.3 to 0.6% of the liquid crystal composition; Formula (I-3) accounts for 0.3 to 0.6% of the liquid crystal composition; Formula (I-4) accounts for 0.3 to 0.6% of the liquid crystal composition;
wherein, the compound of the liquid crystal composition of each of the pH sensing devices is different from each other.

19. A pH sensing device kit, comprising:
a plurality of the pH sensing devices, wherein each of the pH sensing devices comprises:
  a substrate;
  a frame, connected to the substrate and forming an accommodation space having an opening;
  an alignment film, located inside the accommodation space;
  two polarizers, wherein one of the polarizers is arranged in correspondence with the opening such that a channel exists therebetween, the other polarizer is located at a lateral side of the substrate, and the polarization directions of the two polarizers are staggered with each other; and
  a liquid crystal composition, located inside the accommodation space, wherein the crystal composition comprises:
    nematic liquid crystal; and
    a compound selected from a group consisting of Formula (I-1), (I-2), (I-3), and (I-4),

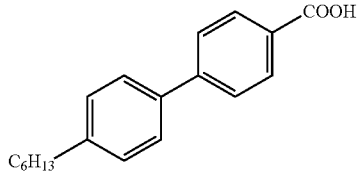
Formula (I-1)

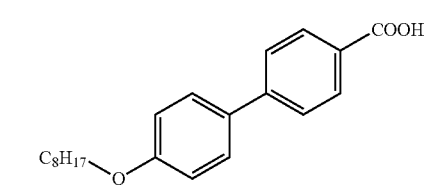
Formula (I-2)

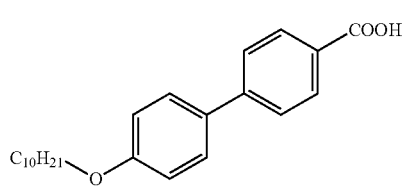
Formula (I-3)

-continued

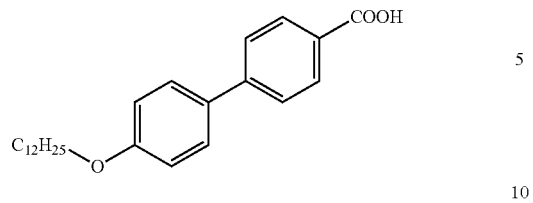

Formula (I-4)

wherein Formula (I-1) accounts for 0.4 to 0.6% of the liquid crystal composition; Formula (I-2) accounts for 0.3 to 0.6% of the liquid crystal composition; Formula (I-3) accounts for 0.3 to 0.6% of the liquid crystal composition; Formula (I-4) accounts for 0.3 to 0.6% of the liquid crystal composition;

wherein, a percentage of the compound of the liquid crystal composition of each of the pH sensing devices is different from each other.

* * * * *